Patented Feb. 26, 1952

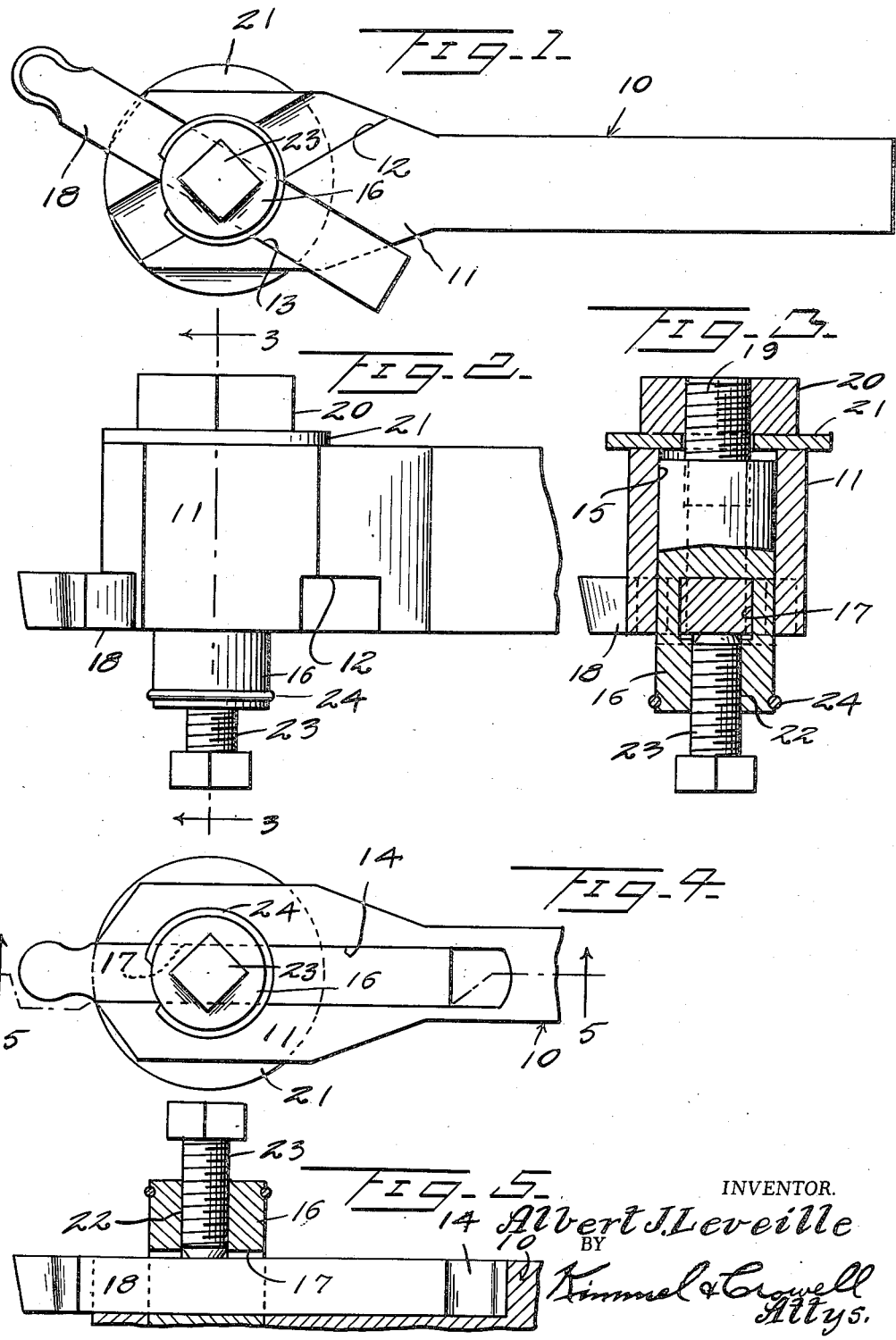

2,587,179

UNITED STATES PATENT OFFICE 2,587,179

TOOL HOLDER

Albert J. Leveille, Johnston, R. I.

Application December 15, 1949, Serial No. 133,046

1 Claim. (Cl. 29—98)

This invention relates to tool holders for lathes or other machine tools.

An object of this invention is to provide a three-in-one tool holder which includes means whereby the bit or cutter may be rigidly secured at a straight or oblique angle with respect to the holder.

Another object of this invention is to provide a tool holder embodying an elongated bar having a head at its outer end, with the head formed with a pair of crossed channels on one side and a longitudinal channel on the opposite side. The bit or cutter is held within a selected channel by means of clamping pin and the bit or cutter can be adjusted endwise.

A further object of this invention is to provide a tool holder of this kind which is strong and rugged and at the same time is of simple construction.

With the above and other objects in view, my invention consists in the arrangement, combination and details of construction disclosed in the drawing and specification, and then more particularly pointed out in the appended claim.

In the drawing,

Figure 1 is a bottom plan view of a tool holder constructed according to an embodiment of this invention, Figure 2 is a fragmentary side elevation of the device, Figure 3 is a sectional view taken on the line 3—3 of Figure 2, Figure 4 is a top plan view of the device, Figure 5 is a fragmentary sectional view taken on the line 5—5 of Figure 4.

Referring to the drawing, the numeral 10 designates generally an elongated bar adapted to be mounted in a tool rest or support, and the bar 10 has formed integral with the forward or outer end thereof a head 11. The head 11 on one side thereof is provided with a pair of crossed channels or grooves 12 and 13, which in the present instance are disposed at substantially 60° one from the other, and 30° from the longitudinal center of the bar 10 and the head 11.

The head 11 on the opposite side thereof, is formed with a longitudinally extending channel or groove 14, and the grooves 12, 13 and 14 intersect a transversely disposed bore 15 which is formed through the head 11. A stud or cutter clamping member 16 is adapted to loosely engage in the bore 15 and is formed with an opening 17 through which a bit or cutter 18 is adapted to engage. The stud or clamping member 16 is formed with a threaded stud 19 at one end thereof on which a nut 20 is adapted to engage, and a washer 21 is interposed between the nut 20 on the adjacent side or face of the head 11.

The stud or clamping member 16 is also formed with a threaded opening 22 within which a set screw 23 engages, the set screw 23 bearing against the adjacent face of the bit or cutter 18. A split resilient retaining ring 24 engages about the outer side of the stud 16 and is adapted to bear against the adjacent face or side of the head 11 so that the stud 16 will be held against dropping out of the bore 15 when the nut 20 is lowermost and either the nut 20 or the set screw 23 is loosened.

In the use of this tool holder the shank or bar 10 is secured in a conventional manner in the tool rest of the lathe or other machine tool and the bit or cutter 18 is disposed in a selected one of the channels 12, 13 or 14. The cross channels are provided so that the cutter operations may be made either right or left hand, whereas the longitudinal channel 14 is provided for using the holder in normal work cutting operations.

With a tool holder as herein disclosed the three individual holders at present in use are combined into one holder, the holder permitting right and left cutting or boring and straight cutting. This tool can be used on lathes, planers, shapers or other machine tools and will eliminate two holders now used.

I do not mean to confine myself to the exact details of construction herein disclosed, but claim all variations falling within the purview of the appended claim.

What I claim is:

A tool holder comprising an elongated bar, a head on one end of said bar, said head having a pair of crossed channels in one face thereof and a longitudinal channel in the opposite face thereof, said head having a cylindrical bore intersecting said channels, a cylindrical clamping stud rotatable in said bore and having a transversely disposed opening through which a bit is adapted to engage, said bit being adapted to seat in a selected one of said channels and projecting through said opening, a threaded stud at one end of said clamping stud, a nut on said threaded stud, a washer of greater diameter than said bore to prevent linear displacement of said clamping stud through said bore in one direction upon removal of said stud interposed between said nut and the adjacent face of said head, a set screw threaded into the opposite end of said clamping stud adapted to bear against said bit to hold the latter against movement in said opening, said opposite end having a peripheral channel thereabout and means of greater extent than said bore on the end of said clamping stud containing said set screw to prevent linear displacement of said stud in the other direction upon removal of said bit, said last mentioned means comprising a split clamping ring seating in said channel and surrounding said opposite end of said clamping stud, removal of said clamping ring permitting ready withdrawal of said clamping stud.

ALBERT J. LEVEILLE.

REFERENCES CITED

The following references are of record in the file of this patent:

UNITED STATES PATENTS

| Number | Name | Date |
|---|---|---|
| 675,184 | Armstrong | May 28, 1901 |
| 963,746 | Colton | July 12, 1910 |
| 1,063,863 | Duckett | June 3, 1913 |
| 1,373,926 | Wermes | Apr. 5, 1921 |

FOREIGN PATENTS

| Number | Country | Date |
|---|---|---|
| 126,768 | Germany | Mar. 12, 1901 |
| 556,317 | Great Britain | Sept. 29, 1943 |